Jan. 17, 1950 F. G. HOLMES 2,495,006

AUTOMATIC TELEPHONE EJECTOR

Filed Oct. 21, 1948 2 Sheets-Sheet 1

INVENTOR.
FRANK G. HOLMES

BY Zoltan P. Polachek

ATTORNEY

Jan. 17, 1950 F. G. HOLMES 2,495,006

AUTOMATIC TELEPHONE EJECTOR

Filed Oct. 21, 1948 2 Sheets-Sheet 2

INVENTOR.
FRANK G. HOLMES

BY Zoltan Polachek

ATTORNEY

Patented Jan. 17, 1950 2,495,006

UNITED STATES PATENT OFFICE 2,495,006

AUTOMATIC TELEPHONE EJECTOR

Frank G. Holmes, Philadelphia, Pa.

Application October 21, 1948, Serial No. 55,799

10 Claims. (Cl. 179—146)

This invention relates to new and useful improvements in devices for facilitating use of the telephone, and, more particularly, the aim is to provide a novel and valuable device whereby a telephone instrument may be normally stored in a location removed from the working top of a desk, table or the like, yet in such manner that whenever the telephone is desired to be used, as to answer an incoming call, a manually operable means may be actuated thereby to cause the telephone instrument to be shifted to a location at which not only may the dial be used to make a call but the receiver may be placed in hearing position and the transmitter in talking position.

A feature of the invention is that, consequent upon actuation of said manually operable means, for shifting of the telephone instrument as above, the receiver, as, for instance, the receiver which in the so-called French telephone instrument is part of a single liftable structure including also the transmitter, becomes automatically elevated out of its telephone-line-closing position in the instrument's cradle.

A further feature of the invention is that said receiver is attached to a hingedly mounted bar-like support, which support may carry simple yet practicable means for readily varying the anchorage of the structure including the receiver and the transmitter on the support, to adapt said structure, when the support is elevated, to position the receiver efficiently relative to the ear of the person at the telephone and at the same time efficiently to place the transmitter relative to the mouth of said person; with the result that then both hands are free, for referring to records and the like and also to permit one hand to write down any memoranda to be recorded and further to permit easy dialing of a desired number when said person wishes to make a telephone call.

Also, according to the invention as preferably carried out, the telephone instrument is secured to and on top of a suitable guided slide plate, and said bar-like support is connected to said plate by a spring hinge, with the parts so arranged and coacting that when the telephone is to be withdrawn for use, all that is necessary is to slide out said plate, and when a telephone use is completed, all that is necessary is to slide in said plate. Due to the coaction between the said bar-like support, and the telephone instrument, the latter has its aforesaid switch opened incidental to sliding out of said plate and has its said switch closed incidental to sliding in of said plate.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1, a horizontal section taken on the line 1—1 of Fig. 2, and partially broken away, shows in top plan an embodiment of the invention as now favored, with the slide retracted, that is, in its normally stored location; the telephone instrument illustrated being a late model of the so-called French instrument.

Figure 1:
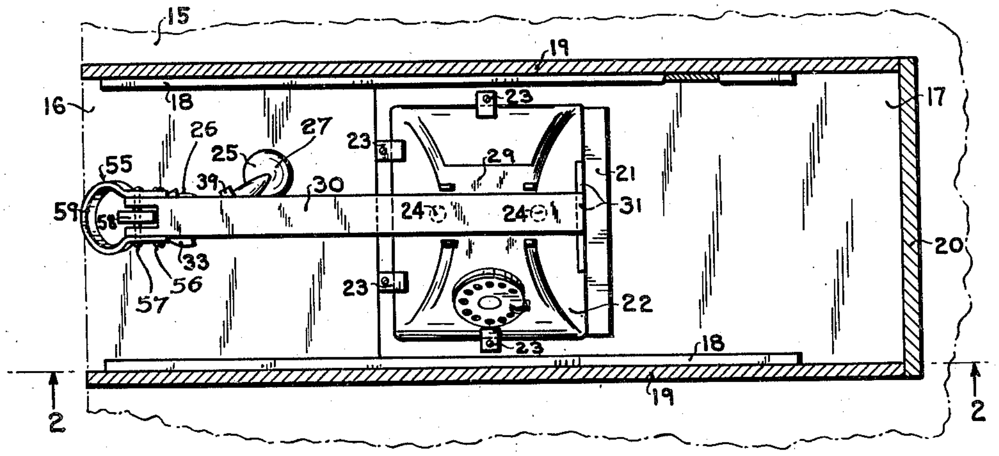

Referring to the drawings more in detail, in Figs. 1 and 2 a desk top at its portion above a knee space is indicated at 15; and in the present case the device of the invention is shown, but only by way of example, as housed in a compartment 16 below the desk top 15, which compartment may be, for instance, the one provided for carrying a pull-out desk drawer, with such drawer omitted.

The already mentioned slide plate is designated 17. This is shown as guidingly engaged along its opposite sides in a pair of channel members 18 suitably secured to any desired support, as to the side walls 19 of the compartment 16. Said plate is shown as rectangular and somewhat elongate, and any suitable means may be provided for engaging the same for limiting its movement in the direction of retraction, as, for instance, the back wall 20 of the compartment 16.

At the inner end of the slide plate 17 there is suitably secured thereto, to vertically upstand therefrom, a transverse wall 21. The telephone instrument 22 is suitably secured to the top of the plate 17, as by a plurality of Z-clips 23; the familiar line-closing switch buttons of the instrument 22 being indicated in Fig. 1 at 24.

Figure 3:
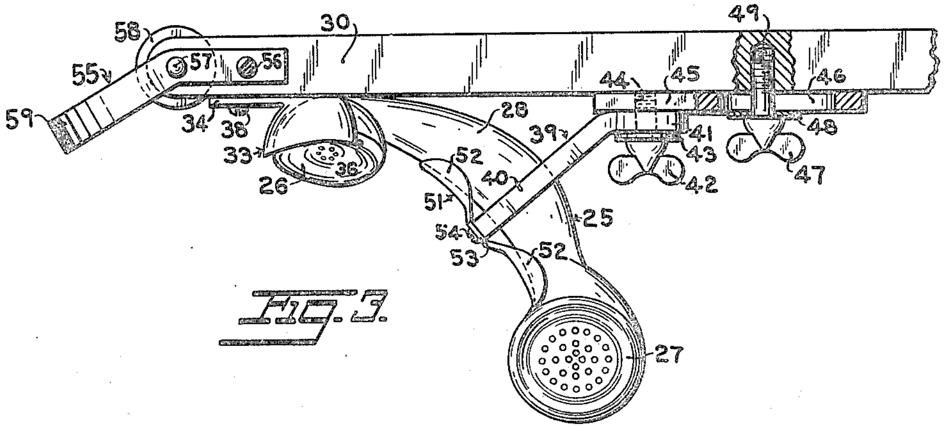
Fig. 3 is a very much enlarged fragmentary side elevational view of the outer end of said bar-like support; with the latter viewed as in Fig. 2.
Figure 4:
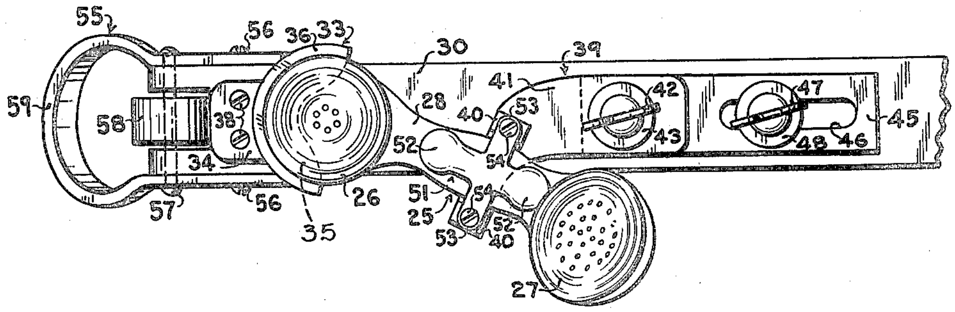
Fig. 4 is a similarly enlarged bottom plan view of the outer end of said support.
Figure 5:
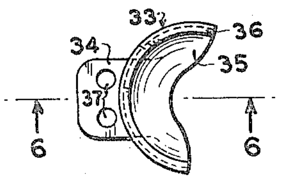
Fig. 5 is a detail view showing a cupping bracket, detached.
Figure 6:
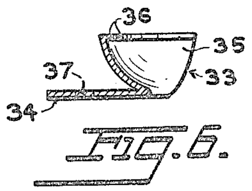
Fig. 6 is a section taken on the line 6—6 of Fig. 5.

In the French type telephone instrument illustrated, the single hereinabove mentioned liftable structure is marked as a whole 25; and this, as best shown in Figs. 3 and 4, includes a receiver portion 26, a transmitter portion 27, and a bridge 28. The bridge 28, as is well known, is so arranged as properly to space apart the receiver portion 26 and the transmitter portion 27, so that while the former is in position to be spoken into the latter is in position for efficient placement adjacent to an ear of a person at the telephone, and, also, is so shaped and extended that when the structure 25 is placed in the cradle 29 of the instrument 22 the weight of the structure acts by way of the bridge 28 to depress the switch-buttons 24 thereby to hold the telephone line closed.

In accordance with the now preferred way of carrying out the present invention, however, such closing of said switch is effected by an end portion of the already mentioned bar-like support, this designated 30. For brevity, the ordinarily manually lifted structure 25 will from now on be called the receiver.

Said support 30, which may be made of any suitable length, and which may if desired be made telescopic for at will modifying its length, is here shown as of one-piece construction. The support 30, at its inner end, is connected to the top of the wall 21 on the slide plate 17, by means of a hinge 31, incorporating a spring, such as indicated at 32, to provide a spring-hinge, or said hinge may be one of the non-spring type but acted on by a suitable spring means; the arrangement being such that there is a resilient force acting on the support at all times and in such manner as to urge the support toward swing in the direction of the arrow 30′ of Fig. 2. The axis or pintle of such hinge connection is so positioned, relative to the top of the telephone instrument 22, that when the support 30 is extended as in Fig. 1 and as shown in full lines in Fig. 2, the underside of the support 30 is forced to bear down on the switch-buttons 24 and so hold the telephone line closed.

The receiver 25 is variously adjustably secured to the support 30 by means illustratively herein shown as including a cupping bracket as a whole marked 33, this having an attaching plate portion 34 carrying a half cup 35 provided with a top flange 36. The said plate portion has a pair of apertures 37, through which screws 38 may be sent for being entered into the support 30 for securing the bracket 33 thereto. The half cup 35 is so shaped and placed on the plate portion 34 that when the receiver portion 26 of the receiver 25 is caught therein, the receiver 25 may be extended generally as shown in Figs. 3 and 4, thereby to tilt the receiver portion 26 slightly toward the ear of a person at the telephone and at the same time to somewhat tilt the transmitter portion 27 toward that person's mouth, when, as will later be explained, the support 30 assumes the vertical position indicated in dot and dash lines in Fig. 2.

For thus generally extending the receiver 25, but nevertheless to allow of considerable variation in the placement of the receiver 25 relative to the support 30, to satisfy individual preferences, the means for securing the receiver 25 to the support 30 is herein shown as including, in addition to and supplementary of, the cupping bracket 33, the further parts now to be described.

A swing-fitment 39 includes a fork portion 40 compoundly obliquely offset from an integral base-plate 41 suitably apertured for receiving the shank of a thumb-screw 42 served by a washer 43. Said screw 42 coacts with a tapped hole 44 through a slide-fitment 45 provided with a slot 46 through which passes the shank of a thumb-screw 47 served by a washer 48. This screw 47 coacts with a tapped hole 49 provided on the support 30.

It will be noted that with the receiver portion 26 of the receiver 25 caught in the cupping bracket 33, and with the bridge 28 of the receiver 25 partially embraced by the fork portion 40 of the swing-fitment 39 and resiliently urged toward full reception in such fork by a cruciform leaf-spring 51 attached at the ends of its lesser arms 53 by screws 54 to the outer ends of the fork portion 40, either or both of the fitments 39 and 45 may be selectively adjusted, the former angularly and the latter rectilinearly along the length of the slot 46, for positioning the receiver 25 exactly as desired. With the major arms 52 of the spring 51 laterally arched as indicated best in Figs. 3 and 4, all the parts now being described may act together to maintain the receiver 25 exactly in the desired position on the support 30.

Figure 2:
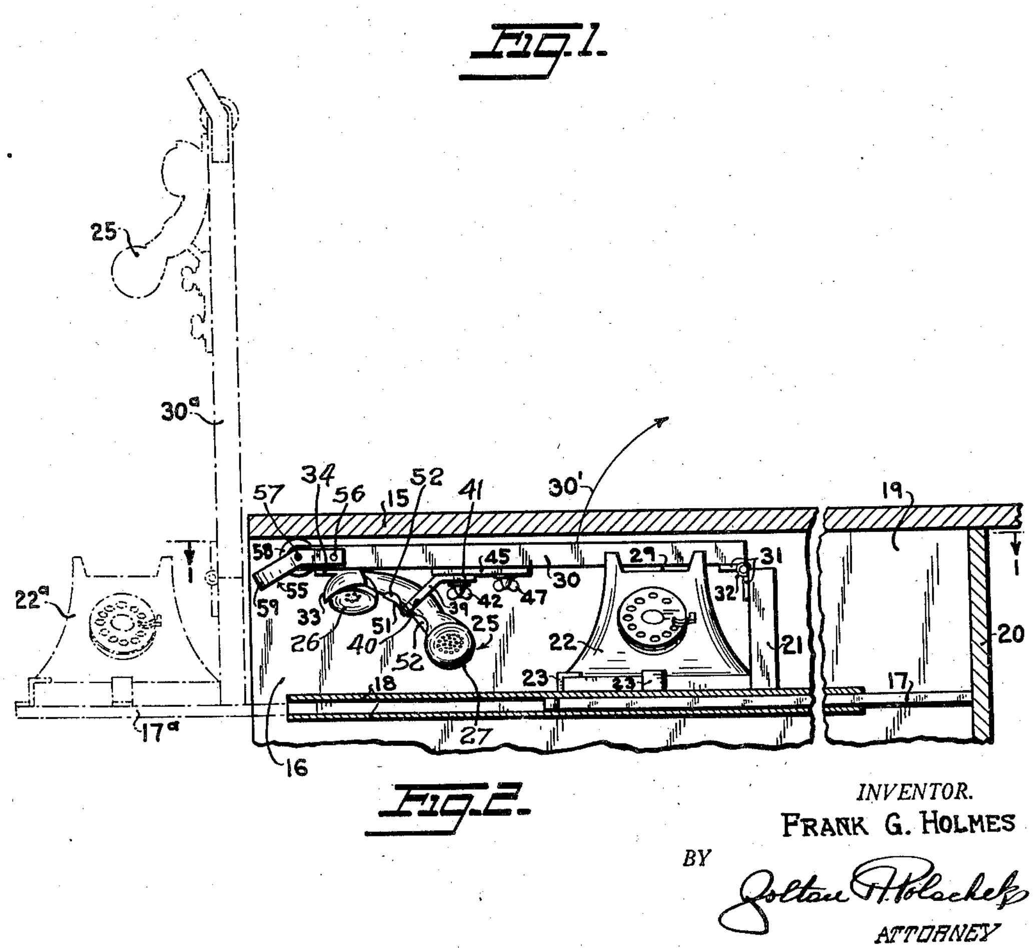
Fig. 2 is a partially broken away vertical section, taken on the line 2—2 of Fig. 1.

The usual flexible wiring to the instrument 22, and from the latter to the receiver 25, is not shown, to avoid unnecessarily adding to the drawings, but, as will be understood, the wiring to the instrument 22 is strung with sufficient slack and suitably guided to allow unimpeded shifting of the instrument back and forth between its full-line and its dot-and-dash-line positions in Fig. 2, and the wiring between the instrument 22 and the receiver 25 is arranged to remain in proper extension along the support 30.

The support 30 at its outer end is forked as shown, and there a U-strap 55 may be provided and secured in place as by a pair of screws 56 and a rivet 57 for pivotally mounting a roller 58 in such fork. Then also, the bight portion of the strap 55 is projected somewhat beyond the outer end of the support 30, for use as a handle.

When the telephone is wanted for use, as when the ringing of its bell announces an incoming call, but one operation is necessary, that is, a pull on the support 30, applied at its outer end, as by way of the handle 59, to advance the slide plate to the location indicated in dot and dash lines at 17ª in Fig. 2. As soon as the roller 58 passes beyond the front edge of the desk top 15, the spring means at the hinge 31 comes into action, and the support 30 begins to swing upward in the direction of the arrow 30′; with the result that when the instrument 22 arrives at the position indicated in dot and dash lines at 22ª in Fig. 2, the support 30 stands vertically upright as indicated in dot and dash lines at 30ª in Fig. 2.

Observe, also, that now the dialing mechanism of the instrument 22 is readily accessible by the person seated at the desk; so that should the withdrawal of the slide plate 17 and the instrument 22 have been made to make a call, the desired number may be immediately dialed.

When the telephone conversation is finished, thrusting in of slide plate 17 all the way, until its inner end abuts the wall 20 or any other equivalent stop means provided, results in restoration of all the parts to the positions shown in Fig. 1 and in full lines in Fig. 2, including a closing of the telephone line by pressure of the support 30 against the switch-buttons 34 as already explained.

The handle 59 may be a convenience in certain installations, but is not necessary in any installation like that shown in Fig. 2, where withdrawal of the slide plate 17 may be effected by pulling on its outer end and retraction thereof may be effected by thrusting on said end.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A device for facilitating use of the telephone, comprising a slide-type carrier for the telephone instrument, means for mounting the instrument immovably on the carrier, a structure adapted to be secured to an article of furniture such as a desk, table or the like and at a location below the top of said furniture article, means partially carried by said structure and partially carried by the carrier for guiding the latter to perform back and forth movements between a retracted and a protruded position thereof, a bar-like support hingedly mounted on said carrier along a substantially horizontal axis arranged transverse to the direction of back and forth movement of the carrier, said axis being between the instrument and the inner end of the carrier and said support being forwardly extended for crossing the switch-button means on the instrument at its portion for cradling its liftable receiver, means for securing the receiver on said support at a point located outwardly from the instrument, and a telephone-disabling means for causing swing of the support downward on its hinge mounting thereby to cause the support to press down on said switch-button means to close the telephone line.

2. A device for facilitating use of the telephone, comprising a slide-type carrier for the telephone instrument, means for mounting the instrument immovably on the carrier, a structure adapted to be secured to an article of furniture such as a desk, table or the like and at a location below the top of said furniture article, means partially carried by said structure and partially carried by the carrier for guiding the latter to perform back and forth movements between a retracted and a protruded position thereof, a bar-like support hingedly mounted on said carrier along a substantially horizontal axis arranged transverse to the direction of back and forth movement of the carrier, said axis being between the instrument and the inner end of the carrier and said support being forwardly extended for crossing the switch-button means on the instrument at its portion for cradling its liftable receiver, means for securing the receiver on said support at a point located outwardly from the instrument, and a telephone-disabling means for causing swing of the support downward on its hinge mounting thereby to cause the support to press down on said switch-button means to close the telephone line, said support being swingable to an upright position when the carrier is in protruded position, and there being means coacting with said hinge means for limiting upward swing of the support to said upright position.

3. A device for facilitating use of the telephone, comprising a slide-type carrier for the telephone instrument, means for mounting the instrument immovably on the carrier, a structure adapted to be secured to an article of furniture such as a desk, table or the like and at a location below the top of said furniture article, means partially carried by said structure and partially carried by the carrier for guiding the latter to perform back and forth movements between a retracted and a protruded position thereof, a bar-like support hingedly mounted on said carrier along a substantially horizontal axis arranged transverse to the direction of back and forth movement of the carrier, said axis being between the instrument and the inner end of the carrier and said support being forwardly extended for crossing the switch-button means on the instrument at its portion for cradling its liftable receiver, means for securing the receiver on said support at a point located outwardly from the instrument, and a telephone-disabling means for causing swing of the support downward on its hinge mounting thereby to cause the support to press down on said switch-button means to close the telephone line, said support being swingable to an upright position when the carrier is in protruded position, and there being means coacting with said hinge means for limiting upward swing of the support to said upright position, there further being yielding means for thus swinging upward the support when the carrier is in protruded position.

4. A device for facilitating use of the telephone, comprising a slide-type carrier for the telephone instrument, means for mounting the instrument immovably on the carrier, a structure adapted to be secured to an article of furniture such as a desk, table or the like and at a location below the top of said furniture article, means partially carried by said structure and partially carried by the carrier for guiding the latter to perform back and forth movements between a retracted and a protruded position thereof, a bar-like support hingedly mounted on said carrier along a substantially horizontal axis arranged transverse to the direction of back and forth movement of the carrier, said axis being between the instrument and the inner end of the carrier and said support being forwardly extended for crossing the switch-button means on the instrument at its portion for cradling its liftable receiver, means for securing the receiver on said support at a point located outwardly from the instrument, and a telephone-disabling means for causing swing of the support downward on its hinge mounting thereby to cause the support to press down on said switch-button means to close the telephone line, said support being swingable to an upright position when the carrier is in protruded position, and there being means coacting with said hinge means for limiting upward swing of the support to said upright position, there further being yielding means for thus swinging upward the support when the carrier is in protruded position, the instrument being so placed on the carrier that when the latter is in protruded position the dialing mechanism of the instrument is located beyond the front of said furniture article top and facing toward a person seated at said furniture article.

5. A device for facilitating use of the telephone, comprising a slide-type carrier for the telephone instrument, means for mounting the instrument immovably on the carrier, a structure adapted to be secured to an article of furniture such as a desk, table or the like and at a location below the top of said furniture article, means partially carried by said structure and partially carried by the carrier for guiding the latter to perform back and forth movements between a retracted and a protruded position thereof, a bar-like support hingedly mounted on said carrier along a substantially horizontal axis arranged transverse to the direction of back and forth movement of the carrier, said axis being between the instrument and the inner end of the carrier and said support being forwardly extended for crossing the switch-button means on the instrument at its portion for cradling its liftable receiver, means for securing the receiver on said support at a point located outwardly from the instrument, and a telephone-disabling means for causing swing of the support downward on its hinge mounting thereby to cause the support to press down on said switch-button means to close the telephone line, said support being swingable to an upright position when the carrier is in protruded position, and there being means coacting with said hinge means for limiting upward swing of the support to said upright position, there further being yielding means for thus swinging upward the support when the carrier is in protruded position, the instrument being so placed on the carrier that when the latter is in protruded position the dialing mechanism of the instrument is located beyond the front of said furniture article top and facing toward a person seated at said furniture article, said telephone-disabling means including a roller at the outer end of said support and a fixed wall above the carrier for being engaged by the roller.

6. A device for facilitating use of the telephone, comprising a slide-type carrier for the telephone instrument, means for mounting the instrument immovably on the carrier, a structure adapted to be secured to an article of furniture such as a desk, table or the like and at a location below the top of said furniture article, means partially carried by said structure and partially carried by the carrier for guiding the latter to perform back and forth movements between a retracted and a protruded position thereof, a bar-like support hingedly mounted on said carrier along a substantially horizontal axis arranged transverse to the direction of back and forth movement of the carrier, said axis being between the instrument and the inner end of the carrier and said support being forwardly extended for crossing the switch-button means on the instrument at its portion for cradling its liftable receiver, means for securing the receiver on said support at a point located outwardly from the instrument, and a telephone-disabling means for causing swing of the support downward on its hinge mounting thereby to cause the support to press down on said switch-button means to close the telephone line, said support being swingable to an upright position when the carrier is in protruded position, and there being means coacting with said hinge means for limiting upward swing of the support to said upright position, there further being yielding means for thus swinging upward the support when the carrier is in protruded position, the instrument being so placed on the carrier that when the latter is in protruded position the dialing mechanism of the instrument is located beyond the front of said furniture article top and facing toward a person seated at said furniture article, said telephone-disabling means including a roller at the outer end of said support and a fixed wall above the carrier for being engaged by the roller, said wall being the top of said furniture article.

7. A device for facilitating use of the telephone, comprising a slide-type carrier for the telephone instrument, means for mounting the instrument immovably on the carrier, a structure adapted to be secured to an article of furniture such as a desk, table or the like and at a location below the top of said furniture article, means partially carried by said structure and partially carried by the carrier for guiding the latter to perform back and forth movements between a retracted and a protruded position thereof, a bar-like support hingedly mounted on said carrier along a substantially horizontal axis arranged transverse to the direction of back and forth movement of the carrier, said axis being between the instrument and the inner end of the carrier and said support being forwardly extended for crossing the switch-button means on the instrument at its portion for cradling its liftable receiver, means for securing the receiver on said support at a point located outwardly from the instrument, and a telephone-disabling means for causing swing of the support downward on its hinge mounting thereby to cause the support to press down on said switch-button means to close the telephone line, said support being swingable to an upright position when the carrier is in protruded position, and there being means coacting with said hinge means for limiting upward swing of the support to said upright position, there further being yielding means for thus swinging upward the support when the carrier is in protruded position, the instrument being so placed on the carrier that when the latter is in protruded position the dialing mechanism of the instrument is located beyond the front of said furniture article top and facing toward a person seated at said furniture article, said means for securing the receiver to the support including a plurality of receiver engaging members, one of which is angularly adjustable on the support.

8. A device for facilitating use of the telephone, comprising a slide-type carrier for the telephone instrument, means for mounting the instrument immovably on the carrier, a structure adapted to be secured to an article of furniture such as a desk, table or the like and at a location below the top of said furniture article, means partially carried by said structure and partially carried by the carrier for guiding the latter to perform back and forth movements between a retracted and a protruded position thereof, a bar-like support hingedly mounted on said carrier along a substantially horizontal axis arranged transverse to the direction of back and forth movement of the carrier, said axis being between the instrument and the inner end of the carrier and said support being forwardly extended for crossing the switch-button means on the instrument at its portion for cradling its liftable receiver, means for securing the receiver on said support at a point located outwardly from the instrument, and a telephone-disabling means for causing swing of the support downward on its hinge mounting thereby to cause the support to press down on said switch-button means to close the telephone line, said support being swingable to an upright position when the carrier is in protruded position, and there being means coacting with said hinge means for limiting upward swing of the support to said upright position, there further being yielding means for thus swinging upward the support when the carrier is in protruded position, the instrument being so placed on the carrier that when the latter is in protruded position the dialing mechanism of the instrument is located beyond the front of said furniture article top and facing toward a person seated at said furniture article, said means for securing the receiver to the support including a plurality of receiver engaging members, one of which is angularly adjustable on the support, and another of which is slidably adjustable on the support.

9. A device for facilitating use of the telephone, comprising a slide-type carrier for the telephone instrument, means for mounting the instrument immovably on the carrier, a structure adapted to be secured to an article of furniture such as a desk, table or the like and at a location below the top of said furniture article, means partially carried by said structure and partially carried by the carrier for guiding the latter to perfom back and forth movements between a retracted and a protruded position thereof, a bar-like support hingedly mounted on said carrier along a substantially horizontal axis arranged transverse to the direction of back and forth movement of the carrier, said axis being between the instrument and the inner end of the carrier and said support being forwardly extended for crossing the switch-button means on the instrument at its portion for cradling its liftable receiver, means for securing the receiver on said support at a point located outwardly from the instrument, and a telephone-disabling means for causing swing of the support downward on its hinge mounting thereby to cause the support to press down on said switch-button means to close the telephone line, said support being swingable to an upright position when the carrier is in protruded position, and there being means coacting with said hinge means for limiting upward swing of the support to said upright position, there further being yielding means for thus swinging upward the support when the carrier is in protruded position, the instrument being so placed on the carrier that when the latter is in protruded position the dialing mechanism of the instrument is located beyond the front of said furniture article top and facing toward a person seated at said furniture article, said means for securing the receiver to the support including a plurality of receiver engaging members, one of which is angularly adjustable on the support, and another of which is slidably adjustable on the support, and another of which is fixed on the support.

10. A device for facilitating use of the telephone, comprising a slide-type carrier for the telephone instrument, means for mounting the instrument immovably on the carrier, a structure adapted to be secured to an article of furniture such as a desk, table or the like and at a location below the top of said furniture article, means partially carried by said structure and partially carried by the carrier for guiding the latter to perform back and forth movements between a retracted and a protruded position thereof, a bar-like support hingedly mounted on said carrier along a substantially horizontal axis arranged transverse to the direction of back and forth movement of the carrier, said axis being between the instrument and the inner end of the carrier and said support being forwardly extended for crossing the switch-button means on the instrument at its portion for cradling its liftable receiver, means for securing the receiver on said support at a point located outwardly from the instrument, and a telephone-disabling means for causing swing of the support downward on its hinge mounting thereby to cause the support to press down on said switch-button means to close the telephone line, said support being swingable to an upright position when the carrier is in protruded position, and there being means coacting with said hinge means for limiting upward swing of the support to said upright position, there further being yielding means for thus swinging upward the support when the carrier is in protruded position, the instrument being so placed on the carrier that when the latter is in protruded position the dialing mechanism of the instrument is located beyond the front of said furniture article top and facing toward a person seated at said furniture article, said means for securing the receiver to the support including a plurality of receiver engaging members, one of which is angularly adjustable on the support, and another of which is slidably adjustable on the support, and another of which is fixed on the support, said fixed member including a cup-like receptor for the receiver portion of the receiver.

FRANK G. HOLMES.

No references cited.